United States Patent
Inaguma

(10) Patent No.: US 6,615,407 B1
(45) Date of Patent: Sep. 2, 2003

(54) IN-BUILDING CATV SYSTEM, AND UP-CONVERTER AND DOWN-CONVERTER FOR USE THEREIN

(75) Inventor: Mitsuhiko Inaguma, Nisshin (JP)

(73) Assignee: Masprodenkoh Kabushikikaisha, Nisshin (JP)

( * ) Notice: Subject to any disclaimer, the term of this patent is extended or adjusted under 35 U.S.C. 154(b) by 0 days.

(21) Appl. No.: 09/507,712

(22) Filed: Feb. 18, 2000

(30) Foreign Application Priority Data

Feb. 19, 1999 (JP) ............................................ 11-041718
Jul. 23, 1999 (JP) ............................................ 11-209551

(51) Int. Cl.[7] ............................ H04N 7/18; H04N 7/173
(52) U.S. Cl. ............................ 725/78; 725/126; 725/127
(58) Field of Search ............................... 725/71, 78, 74, 725/80, 111, 118, 126, 127, 128, 148, 149, 83

(56) References Cited

U.S. PATENT DOCUMENTS

| | | | | |
|---|---|---|---|---|
| 3,778,716 A | * | 12/1973 | Stokes | 725/73 |
| RE31,639 E | * | 7/1984 | Nicholson | 725/105 |
| 4,494,138 A | * | 1/1985 | Shimp | 725/121 |
| 4,569,084 A | * | 2/1986 | Takahama | 455/131 |
| 5,230,086 A | * | 7/1993 | Saul | 455/502 |
| 5,548,811 A | * | 8/1996 | Kumagai et al. | 455/192.2 |
| 5,557,319 A | * | 9/1996 | Gurusami et al. | 725/126 |
| 5,574,964 A | * | 11/1996 | Hamlin | 725/78 |
| 5,760,822 A | * | 6/1998 | Coutinho | 348/121 |
| 5,765,099 A | * | 6/1998 | Georges et al. | 455/14 |
| 5,835,128 A | * | 11/1998 | Macdonald et al. | 725/81 |
| 6,006,066 A | * | 12/1999 | Krimmel | 725/125 |
| 6,094,211 A | * | 7/2000 | Baran et al. | 725/125 |
| 6,160,571 A | * | 12/2000 | Wang | 725/127 |
| 6,181,365 B1 | * | 1/2001 | Nakagawara | 725/124 |
| 6,212,397 B1 | * | 4/2001 | Langston et al. | 455/500 |
| 6,430,742 B1 | * | 8/2002 | Chanteau | 725/74 |
| 6,481,013 B1 | * | 11/2002 | Dinwiddie et al. | 725/80 |
| 6,486,907 B1 | * | 11/2002 | Farber et al. | 725/78 |

FOREIGN PATENT DOCUMENTS

| | | |
|---|---|---|
| JP | 10174084 | 6/1998 |
| JP | 11004426 | 1/1999 |
| JP | 11220716 | 8/1999 |

* cited by examiner

*Primary Examiner*—John Miller
*Assistant Examiner*—Scott Beliveau
(74) *Attorney, Agent, or Firm*—Davis & Bujold, P.L.L.C.

(57) ABSTRACT

A down-converter comprises a frequency division circuit, PLL, and local oscillation circuit to convert a signal from a reference oscillation circuit to a converting reference signal with a constant frequency, and uses this signal to frequency-convert an in-building upward signal to an upward signal able to be transmitted in an external bi-directional CATV system. When the frequency of the converting reference signal deviates from the frequency of the converting reference signal on the side of an up-converter for converting the upward signal to the in-building upward signal on a terminal side, the upward signal cannot be accurately restored. Therefore, the down-converter uses the frequency division circuit to convert the converting reference signal to a transmitting reference signal with a low frequency, and outputs the transmitting reference signal to the terminal side.

9 Claims, 7 Drawing Sheets

IN-BUILDING CATV SYSTEM, AND UP-CONVERTER AND DOWN-CONVERTER FOR USE THEREIN

BACKGROUND OF THE INVENTION (i) Field of the Invention

The present invention relates to an in-building CATV system connected to a lead-in wire from an external bi-directional CATV system for transmitting signals between the external bi-directional CATV system and an in-building terminal unit, an up-converter for converting the frequency of a signal inputted from the in-building terminal unit to an in-building upward signal in the in-building CATV system, and to a down-converter for converting the frequency of the in-building upward signal transmitted from the up-converter to the transmission frequency in the bi-directional CATV system to transmit the signal onto the transmission path of the bi-directional CATV system.

(ii) Description of the Related Art

In a conventional known in-building CATV system, a downward signal inputted via the lead-in wire (specifically, the downward signal transmitted from the central apparatus of the bi-directional CATV system) is transmitted to a terminal unit in a building via a transmission line in the building. Additionally, an upward signal inputted from the terminal unit on a subscriber side is transmitted, via the transmission line in the building, to the lead-in wire, and outputted toward the central apparatus of the bi-directional CATV system via the lead-in wire.

Moreover, in the in-building CATV system, noises generated in the building are superposed to the in-building transmission line, flow together, and are outputted to the external bi-directional CATV system together with the upward signal.

To reduce the confluent noises flowing out to the external bi-directional CATV system, in a heretofore proposed method, the upward signal generated in the subscriber terminal unit such as a cable modem (the signal with a frequency band, for example, of 5 to 42 MHz which can be transmitted by the bi-directional CATV system) is once frequency-converted in an up-converter to an upward signal (hereinafter referred to as the in-building upward signal) with a UHF band (e.g., 913 to 950 MHz) which is higher than the original frequency and which does not overlap the transmission frequency (e.g., 54 to 860 MHz) of the downward signal. The in-building upward signal is transmitted toward the lead-in wire, and the down-converter is used to convert the frequency of the in-building upward signal to the original frequency (in other words, the transmission frequency of the upward signal in the bi-directional CATV system) immediately before the upward signal from the in-building transmission line is outputted to the lead-in wire.

On the other hand, when the upward signal is frequency-converted to the in-building upward signal by the up-converter of the in-building CATV system, and the in-building upward signal is frequency-converted to the original upward signal by the down-converter of the in-building CATV system, the confluent noises outputted to the external bi-directional CATV system from the in-building CATV system can be reduced. However, when the up-converter and the down-converter are constituted to use reference signals from their respective oscillation circuits and perform the frequency conversion, a deviation is generated in the frequency of a frequency-converting reference signal obtained in each oscillation circuit, and in some cases the down-converter cannot convert the in-building upward signal to the original upward signal generated by the subscriber terminal unit

SUMMARY OF THE INVENTION

Wherefore, an object of the present invention is to provide an in-building CATV system in which the frequency of an upward signal is once converted to a high frequency by an up-converter on a terminal side and transmitted on a transmission line in a building, and the frequency of the in-building upward signal is returned to an original frequency by a down-converter before outputted to an external bi-directional CATV system, so that confluent noises outputted to the external bi-directional CATV system are reduced, and converting reference signals used for frequency conversion in both the converters are allowed to accurately coincide with each other with a simple constitution.

To attain this and other objects, according to one aspect of the present invention, there is provided an in-building CATV system comprising: a down-converter disposed between a lead-in wire and an in-building transmission line for outputting a downward signal inputted via the lead-in wire toward an in-building transmission line, using a pilot signal included in the downward signal to frequency-convert an in-building upward signal inputted via the transmission line to an upward signal corresponding to a transmission frequency in a bi-directional CATV system, and outputting the upward signal toward the lead-in wire; and an up-converter disposed between the in-building transmission line and a subscriber terminal unit for outputting the downward signal transmitted on the in-building transmission line toward the subscriber terminal unit and frequency-converting the upward signal inputted from the terminal unit to the in-building upward signal using the pilot signal, and outputting the in-building upward signal toward the in-building terminal line.

According to the present invention, the up-converter and the down-converter can use the pilot signal of the bi-directional CATV system to allow the converting reference signals to coincide with each other, and the down-converter can accurately restore the in-building upward signal to the original upward signal.

According to another aspect of the present invention, there is provided an in-building CATV system comprising: a reference signal generating circuit for generating a reference signal for use in frequency conversion; a down-converter disposed between a lead-in wire and an in-building transmission line for outputting a downward signal inputted via the lead-in wire toward an in-building transmission line, using the reference signal to frequency-convert an in-building upward signal inputted via the transmission line to an upward signal corresponding to a transmission frequency in a bi-directional CATV system, and outputting the upward signal toward the lead-in wire; and an up-converter disposed between the in-building transmission line and a subscriber terminal unit for outputting the downward signal transmitted on the in-building transmission line toward the subscriber terminal unit and frequency-converting the upward signal inputted from the terminal unit to the in-building upward signal using the reference signal, and outputting the in-building upward signal toward the in-building transmission line.

According to the present invention, the up-converter and the down-converter can use the reference signal generated by the reference signal generating circuit to allow the converting reference signals to coincide with each other, and the down-converter can accurately restore the in-building upward signal to the original upward signal.

According to still another aspect of the present invention, there is provided an in-building CATV system comprising: a first reference signal generating unit for generating a reference signal for use in frequency conversion; a second reference signal generating unit for generating the same reference signal as the reference signal using a pilot signal; a determining unit for determining whether or not the pilot signal is included in a downward signal; a selecting unit for selecting the reference signal generated by the first reference signal generating unit when the determining unit determines that no pilot signal is included in the downward signal, and for selecting the reference signal generated by the second reference signal generating unit when the determining unit determines that the pilot signal is included in the downward signal; a down-converter disposed between a lead-in wire and an in-building transmission line for outputting the downward signal inputted via the lead-in wire toward an in-building transmission line, using the reference signal selected by the selecting unit to frequency-convert an in-building upward signal inputted via the transmission line to an upward signal corresponding to a transmission frequency in a bi-directional CATV system, and outputting the upward signal toward the lead-in wire; and an up-converter disposed between the in-building transmission line and a subscriber terminal unit for outputting the downward signal transmitted on the in-building transmission line toward the subscriber terminal unit and frequency-converting the upward signal outputted from the terminal unit to the in-building upward signal using the reference signal selected by the selecting unit, and outputting the in-building upward signal toward the in-building transmission line.

According to the present invention, when the transmission of the pilot signal is discontinued in the bi-directional CATV system, or when such pilot signal is not transmitted by the bi-directional CATV system, the up-converter and the down-converter can allow the converting reference signals to coincide with each other, and the down-converter can accurately restore the in-building upward signal to the original upward signal.

BRIEF DESCRIPTION OF THE DRAWINGS

Embodiments of the present invention will be described hereinafter with reference to the drawings, in which.

DETAILED DESCRIPTION OF PREFERRED EMBODIMENTS

First Embodiment

Figure 1:
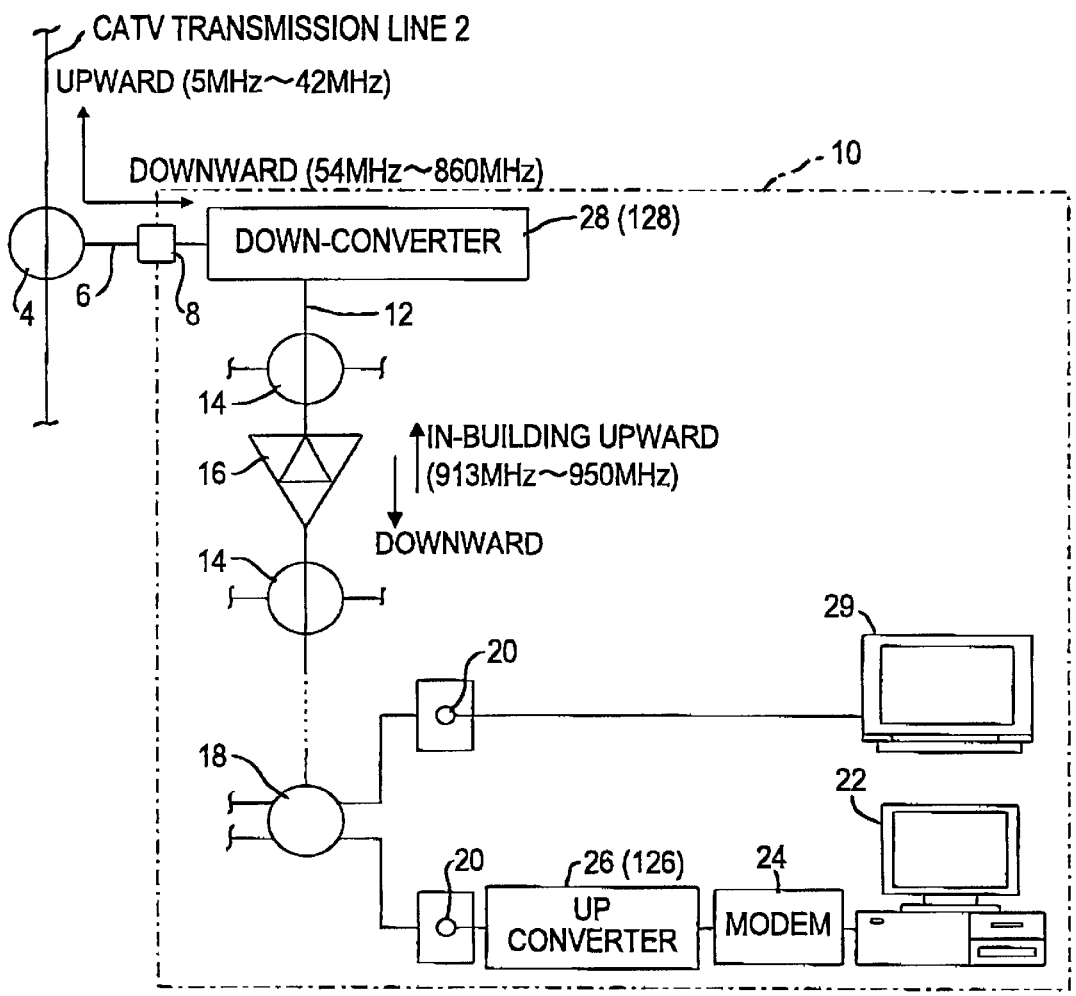
FIG. 1 is a schematic view showing the main constitution of an in-building CATV system according to first and second embodiments of the present invention.

As shown in FIG. 1, the in-building CATV system of the present embodiment is connected to a lead-in wire 6 branched via a tap unit 4 from a transmission line (CATV transmission line) 2 of an external bi-directional CATV system via a protector 8. A downward signal of the bi-directional CATV system with a frequency of 54 MHz to 860 MHz inputted from the lead-in wire 6 is transmitted to a large number of subscriber terminals 20 in a building 10 via a transmission line 12 in the building 10, directional couplers 14, bi-directional amplifiers 16, and splitters 18, disposed on the transmission line 12. Additionally, an upward signal (in-building upward signal) inputted from the terminal 20 is transmitted to the CATV transmission line via the lead-in wire 6.

Moreover, in the in-building CATV system of the present embodiment, data for reserving a pay program, television shopping, and the like are generated in an information terminal 22 such as a personal computer and transmitted to a central apparatus of the external bi-directional CATV system. In this case, a cable modem 24 converts the data to an upward signal with a predetermined frequency band (5 to 42 MHz in the present embodiment) which can be transmitted in the external bi-directional CATV system. Furthermore, an up-converter 26 is used to frequency-convert this upward signal to an in-building upward signal with a predetermined frequency band (913 to 950 MHz in the present embodiment), and the in-building upward signal is supplied to the terminal 20.

For this purpose, a connection portion of the transmission line 12 of the in-building CATV system and the lead-in wire 6 from the external bi-directional CATV system is provided with a down-converter 28 for returning or frequency-converting the in-building upward signal transmitted from the terminal 20 via the transmission line 12 to the upward signal which can be used in the external bi-directional CATV system.

Additionally, in FIG. 1, the terminal 20 which is not connected to the up-converter 26 is connected to a television receiver 29 for receiving the downward signal transmitted via the transmission line 12 to demodulate/regenerate the signal.

Figure 2:
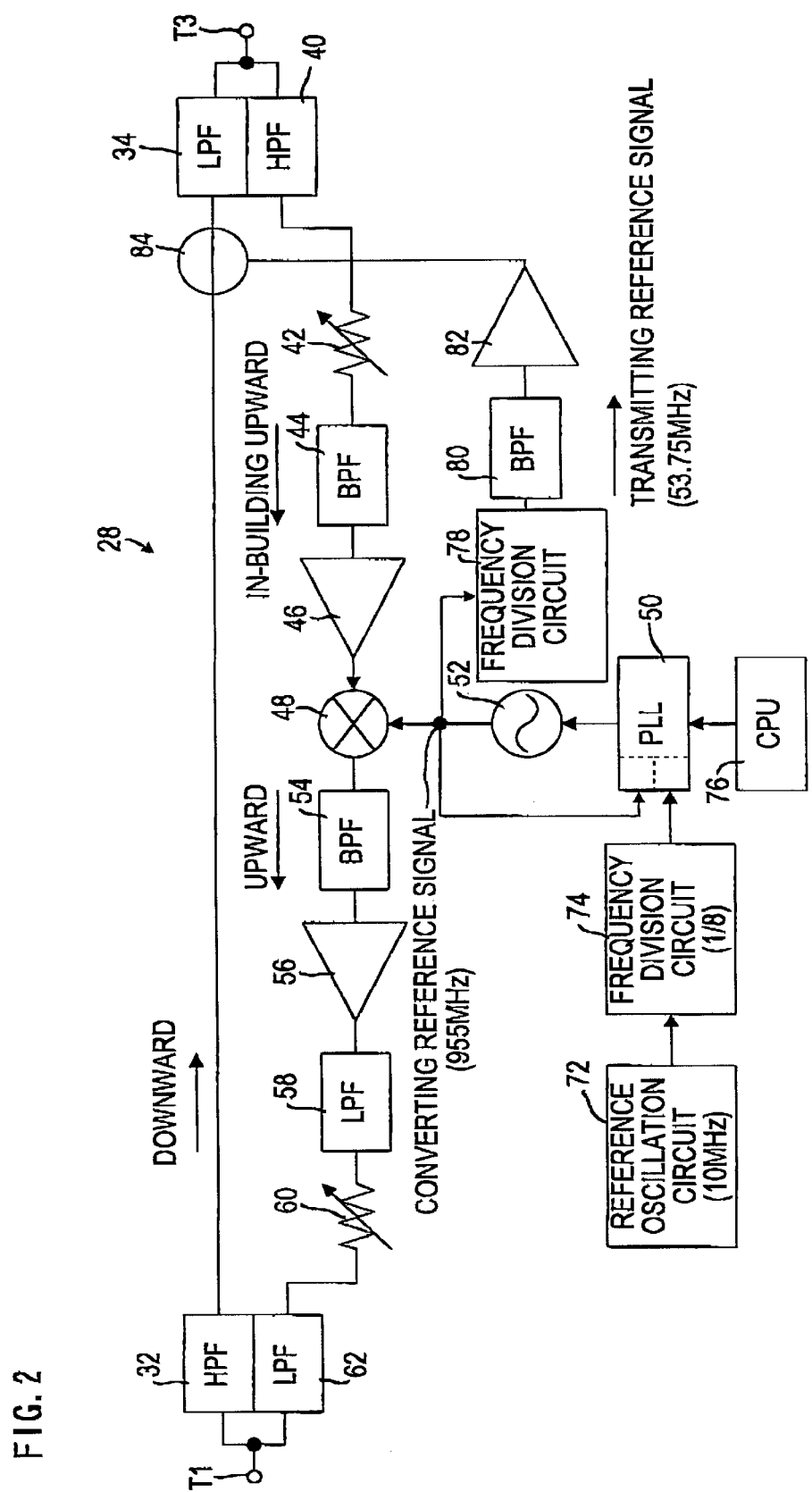
FIG. 2 is a block diagram showing the constitution of a down-converter according to the first embodiment.

Furthermore, the down-converter 28 is constituted as shown in FIG. 2.

As shown in FIG. 2, the down-converter 28 is provided with an external connection terminal T1 for connecting the lead-in wire from the external bi-directional CATV system, and an internal connection terminal T3 for connecting the transmission line 12 in the building 10. Moreover, the downward signal inputted to the external connection terminal T1 is taken into the down-converter 28 via an HPF 32 with a cutoff frequency, for example, of 54 MHz for blocking the input of the frequency-converted upward signal and passing the downward signal Subsequently, the taken downward signal is transmitted to an LPF (low pass filter) 34 through an internal downward signal path, and outputted toward the internal connection terminal T3 via the LPF 34.

Additionally, the LPF 34 cuts off the in-building upward signal inputted from the internal connection terminal T3, and passes the downward signal, and its cutoff frequency is set, for example, to 860 MHz.

The downward signal passed through the LPF 34 can be transmitted to the transmission line 12 from the internal connection terminal T3.

Furthermore, the in-building upward signal inputted to the internal connection terminal T3 from the terminal side is taken into the down-converter 28 via an HPF (high pass filter) 40. Additionally, the HPF 40 prevents the downward signal passed through the downward signal path from turning around, and selectively passes only the in-building upward signal, and its cutoff frequency is set, for example, to 913 MHz.

Subsequently, the in-building upward signal introduced via the HPF 40 is inputted to an amplification circuit 46 for amplifying the in-building upward signal through an attenuator 42 for attenuating the in-building upward signal, and a band pass filter (hereinafter referred to as BPF) 44 for passing the in-building upward signal. After the signal is amplified in the amplification circuit 46 to provide a predetermined level determined by the attenuation amount of the attenuator 42 and the amplification factor of the amplification circuit 46, the signal is inputted to a mixer 48 for frequency conversion.

The mixer 48 receives the signal from a local oscillation circuit 52. The signal is used as a converting reference signal. The oscillation frequency of the signal is controlled to be constant, for example, at 955 MHz in the present embodiment by a PLL circuit 50 described later The mixer 48 also frequency-converts the in-building upward signal to the upward signal for the bi-directional CATV system. The frequency-converted upward signal is transmitted to an LPF 62 via a BPF 54 for passing the upward signal, an amplification circuit 56 for amplifying the upward signal, an LPF 58 for passing the upward signal, and an attenuator 60 for attenuating the upward signal, and outputted toward the lead-in line 6 from the LPF 62 via the external connection terminal T1.

Additionally, the attenuator 60 adjusts the level of the upward signal outputted toward the lead-in wire 6 from the external connection terminal T1. Moreover, the LPF 62 cuts off the downward signal inputted to the external connection terminal T1, and passes the frequency-converted upward signal, and its cutoff frequency is set, for example, to 42 MHz.

The down-converter 28 is also provided with a reference oscillation circuit 72 having an oscillation frequency of 10 MHz, and a frequency division circuit 74 for dividing the frequency of the output signal from the reference oscillation circuit 72 to provide a ⅛ period and generating a reference signal with a constant frequency of 1.25 MHz in the present embodiment as the source of the converting reference signal. Moreover, the output from the frequency division circuit 74 is inputted to the PLL circuit 50.

The PLL circuit 50 takes in the output signal from the frequency division circuit 74 and the output signal from the local oscillation circuit 52 via their respective internal frequency division circuits, and controls the local oscillation circuit 52 based on the phase difference of the divided signals, so that the oscillation frequency of the local oscillation circuit 52 is controlled to provide a constant frequency of 955 MHz. The down-converter 28 is also provided with a microcomputer 76 (hereinafter referred to as CPU) to set the oscillation frequency of the local oscillation circuit 52 controlled by this PLL circuit 50, that is, the frequency division ratio of a frequency division circuit inside the PLL circuit 50.

Furthermore, the down-converter 28 is provided with a frequency division circuit 78 for dividing the frequency of the output (i.e., the converting reference signal) from the local oscillation circuit 52 and generating a transmitting reference signal having a predetermined frequency of 53.75 MHz in the present embodiment, a BPF 80 for passing the transmitting reference signal outputted from the frequency division circuit 78, an amplification circuit 82 for amplifying the transmission reference signal passed through the BPF 80 to provide a predetermined level, and a mixing circuit 84 for mixing the transmitting reference signal amplified in the amplification circuit 82 and the downward signal path leading to the LPF 34 from the HPF 32 to transmit an output toward the terminal side from the LPF 34.

As described above, in the down-converter 28 of the present embodiment, the converting reference signal is generated based on the output from the built-in reference oscillation circuit 72, and the in-building upward signal is frequency-converted to the upward signal for the external bi-directional CATV system based on the converting reference signal. Moreover, the converting reference signal is frequency-converted to the transmitting reference signal with the substantial minimum frequency of the downward signal, that is, 53.75 MHz in the frequency division circuit 78 as the second reference signal generating circuit, and transmitted onto the transmission line on the terminal side.

Figure 3:
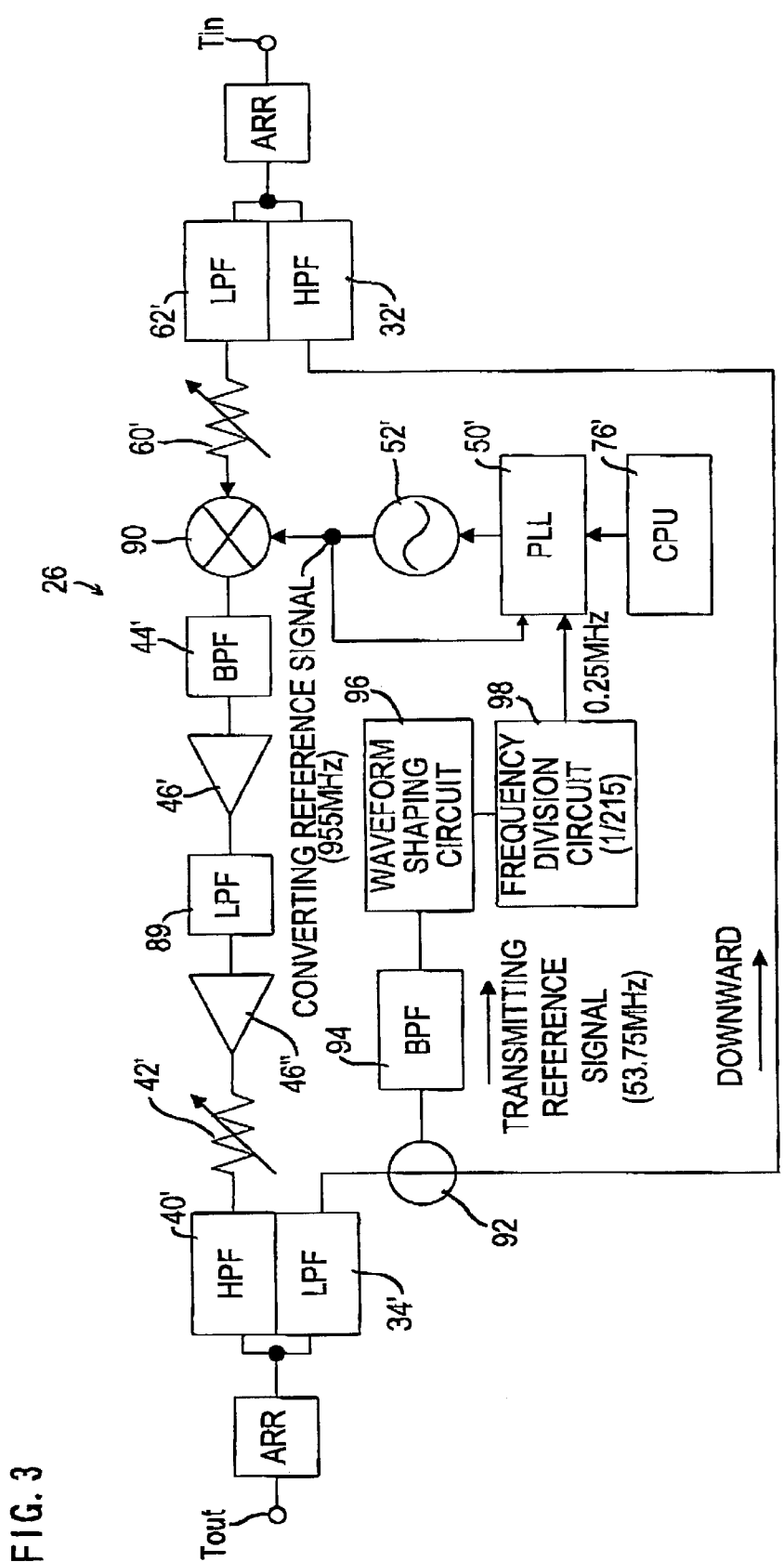
FIG. 3 is a block diagram showing the constitution of an up-converter according to the first embodiment.

On the other hand, the up-converter 26 is constituted as shown in FIG. 3. Additionally, in FIG. 3, the constituting elements having the same functions as those of the constituting elements of the down-converter 28 are shown with the same numerals with "'" or "''" attached thereto.

As shown in FIG. 3, the up-converter 26 is provided with an input terminal Tin for inputting an upward signal from the cable modem 24, and an output terminal Tout for outputting the frequency-converted in-building upward signal toward the terminal 20.

Moreover, the downward signal inputted to the output terminal Tout via the transmission line 12 is once taken into the up-converter 26 via an LPF 34' for cutting off the in-building upward signal and passing the downward signal, and inputted to an internal downward signal path. Furthermore, the downward signal passed through the downward signal path is outputted to the terminal side from the input terminal Tin via an HPF 32' for cutting off the upward signal and passing the downward signal.

The upward signal inputted to the input terminal Tin from the terminal side is taken into the up-converter 26 via an LPF 62' for cutting off the downward signal and passing the upward signal. The introduced upward signal is inputted to a mixer 90 via an attenuator 60' for attenuating the upward signal, and frequency-converted to the in-building upward signal using the reference signal from a local oscillation circuit 52' in the mixer 90.

Additionally, the mixer 90 receives the reference signal, with the oscillation frequency controlled to be constant by a PLL circuit 50', from the local oscillation circuit 52', and frequency converts the upward signal to the in-building upward signal. Moreover, the frequency of the reference signal for use in the frequency conversion by the mixer 90 is set to the same frequency (955 MHz) as the frequency of the converting reference signal for use in the frequency conversion of the in-building upward signal to the upward signal by the down-converter 28. As described previously, as with regard to FIG. 2 an down-converter 28, a microcomputer, identified as CPU 76', may be used to control PLL 50'.

Subsequently, the frequency-converted in-building upward signal is transmitted to an HPF 40' for cutting off the downward signal and passing the in-building upward signal, via a BPF 44' for passing only the in-building upward signal, an amplification circuit 46' for amplifying the in-building upward signal, an LPF 89 for passing the in-building upward signal, an amplification circuit 46" for amplifying the in-building upward signal, and an attenuator 42' for attenuating the in-building upward signal, and outputted toward the transmission line 12 from the HPF 40' via the output terminal Tout.

Furthermore, a directional coupler 92 for branching a part of the downward signal passed through the LPF 34' is disposed in the downward signal path leading to the HPF 32' from the LPF 34', and the downward signal branched by this directional coupler 92 is inputted to a BPF 94 for passing the transmitting reference signal (53.75 MHz) transmitted from the down-converter 28. Furthermore, the downward signal (transmitting reference signal) passed through the BPF 94 is inputted to a waveform shaping circuit 96, and the transmitting reference signal subjected to the waveform shaping in the waveform shaping circuit 96 is inputted to a frequency division circuit 98, which divides the frequency of the transmitting reference signal to provide a ¹/₂₁₅ period and generates the signal of a predetermined frequency of 0.25 MHz. The reference signal generated in the frequency division circuit 98 is inputted to the PLL circuit 50'.

As described above, in the up-converter 26 of the present embodiment, the converting reference signal with the same frequency as that of the down-converter 28 is generated based on the transmitting reference signal generated by dividing the frequency of the converting reference signal in the down-converter 28, and the upward signal is frequency-converted to the in-building upward signal using the converting reference signal.

Additionally, in order to protect the internal circuit from an abnormal high voltage inputted from the terminal side or from the in-building CATV system side by thunderbolt, the up-converter 26 of the present embodiment is provided with arrestors ARR on a signal path leading to the HPF 32' and the LPF 62' from the input terminal Tin and on a signal path leading to the HPF 40' and the LPF 34' from the output terminal Tout.

As described above, in the in-building CATV system of the present embodiment, the converting reference signal with a frequency of 955 MHz which is used to frequency-convert the in-building upward signal to the upward signal in the down-converter 28 is converted to the transmitting reference signal with a frequency of 53.75 MHz on the down-converter 28, and transmitted to the up-converter 26. On the up-converter 26, the converting reference signal with the same frequency as that of the down-converter 28 is generated based on the transmitting reference signal, and the upward signal is frequency-converted to the in-building upward signal.

Therefore, according to the present embodiment, the frequencies of the converting reference signals used by the down-converter 28 and the up-converter 26 to frequency-convert the upward signal or the in-building upward signal can be allowed to coincide with each other. In the down-converter 28, the original upward signal of the in-building upward signal frequency-converted by the up-converter 26 can accurately be restored.

Furthermore, in the present embodiment, in order to allow the frequencies of the converting reference signals for use in the frequency conversion in the down-converter 28 and the up-converter 26 to coincide with each other, different from the prior art in which the converting reference signal is outputted to the terminal side from the down-converter 28 as it is, the converting reference signal is converted to the transmitting reference signal with the substantial minimum frequency of the downward signal on the side of the down-converter 28, and transmitted to the terminal side. Therefore, the transmission loss of the transmitting reference signal occurring in the transmission line 12 is reduced, and the transmitting reference signal can effectively be transmitted to the up-converter 26 on the terminal side.

Moreover, the frequency of the transmitting reference signal is set to the substantial minimum frequency of the downward signal, and a frequency difference between the transmitting reference signal and the in-building upward signal is remarkably large. Therefore, on the side of the up-converter 26, by using the HPF 40' and LPF 34', the downward signal including the transmitting reference signal and the frequency-converted in-building upward signal can easily and securely be divided. As compared with the prior art in which the converting reference signal is transmitted to the terminal side as it is from the down-converter 28, the filter properties of the HPF 407 and LPF 34' can be alleviated, the freedom degree in design can be enhanced, and the cost reduction of the up-converter 26 can be realized.

Furthermore, particularly as in the present embodiment, when the frequency of the converting reference signal is set to be higher than the frequency of the in-building upward signal, in the constitution in which the converting reference signal is transmitted to the terminal side from the down-converter 28 as it is, the in-building upward signal is positioned between the downward signal and the converting reference signal on the frequency axis. Therefore, the filter structure for separating these signals becomes much complicated in the up-converter 26. This problem can also be prevented according to the present embodiment.

One embodiment of the present invention has been described above, but the present invention is not limited to the above-described embodiment, and can variously be embodied.

For example, in the above-described embodiment, in the down-converter 28, the transmitting reference signal is generated by dividing the frequency of the converting reference signal generated in the local oscillation circuit 52. However, the transmitting reference signal may be generated by frequency multiplication of the output from the reference oscillation circuit 72, or the output from the frequency division circuit 74.

Second Embodiment

Since the constitution of the in-building CATV system of a second embodiment is the same as the constitution shown in FIG. 1 except the electric constitution of an up-converter 126 and a down-converter 128, the description thereof is omitted.

Figure 4:
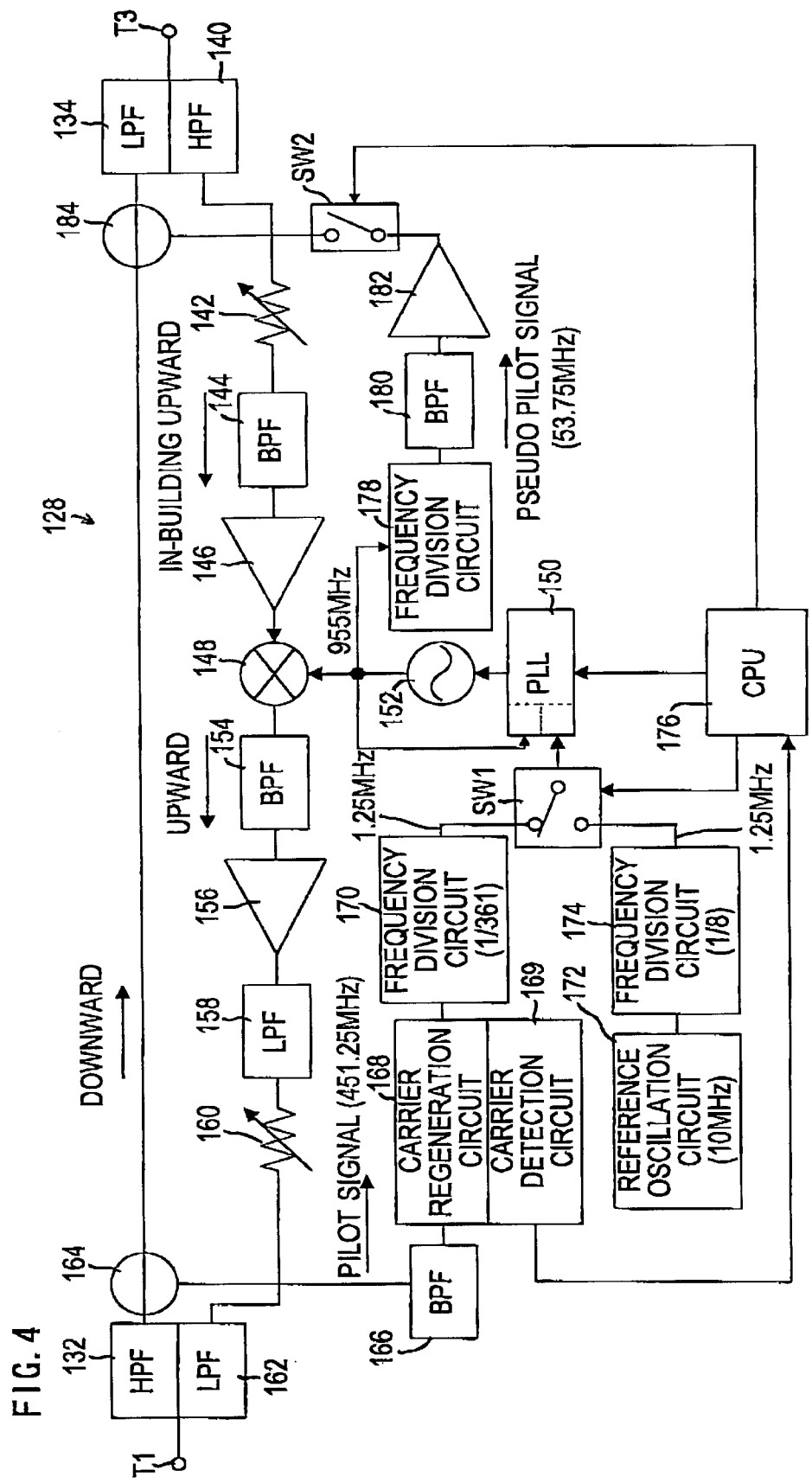
FIG. 4 is a block diagram showing the constitution of the down-converter according to the second embodiment.

The down-converter 128 of the second embodiment is constituted as shown in FIG. 4.

As shown in FIG. 4, the down-converter 128 is provided with an external connection terminal T1 for connecting the lead-in wire from the external bi-directional CATV system, and an internal connection terminal T3 for connecting the transmission line 12 in the building 10. Moreover, the downward signal inputted to the external connection terminal T1 is taken into the down-converter 128 via an HPF 132 for blocking the upward signal, and is then transmitted toward the internal connection terminal T3 via an LPF 134 for blocking the in-building upward signal.

Furthermore, the in-building upward signal inputted to the internal connection terminal T3 from the terminal side is taken into the down-converter 128 via an HPF 140 for blocking the downward signal. Subsequently, the introduced in-building upward signal is inputted to an amplification circuit 146 for amplifying the in-building upward signal through an attenuator 142 for attenuating the in-building upward signal, and a BPF 144 for passing the in-building upward signal. After the signal is amplified in the amplification circuit 146 to provide a predetermined level determined by the attenuation amount of the attenuator 142 and the amplification factor of the amplification circuit 146, the signal is inputted to a mixer 148 for frequency conversion.

The mixer 148 receives the signal from a local oscillation circuit 152. The oscillation frequency of the signal is controlled to be constant, for example, at 955 MHz in the present embodiment by a PLL circuit 150. The mixer 148 also frequency-converts the in-building upward signal to the upward signal for the bi-directional CATV system. The frequency-converted upward signal is transmitted to an LPF 162 for blocking the downward signal via a BPF 154 for passing the upward signal, an amplification circuit 156 for amplifying the upward signal, an LPF 158 for passing the upward signal, and an attenuator 160 for attenuating the upward signal, and outputted toward the lead-in line 6 from the LPF 162 via the external connection terminal T1.

Additionally, the attenuator 160 adjusts the level of the upward signal outputted toward the lead-in wire 6 from the external connection terminal T1.

Moreover, a directional coupler 164 for branching a part of the downward signal passed through the HPF 132 is disposed on the downward signal path leading to the LPF 134 from the HPF 132. The downward signal branched by this directional coupler 164 is inputted to an BPF 166, which passes a pilot signal of 451.25 MHz for use in level adjustment of the downward signal in the bi-directional CATV system.

Furthermore, the downward signal passed through the BPF 166, that is, the pilot signal is inputted to a carrier regeneration circuit 168 for regenerating a pilot signal carrier. The pilot signal carrier regenerated in the carrier regeneration circuit 168 is inputted to a frequency division circuit 170, which divides the frequency of the carrier to provide a 1/361 period and generates the reference signal of a predetermined frequency of 1.25 MHz in the present embodiment.

The down-converter 128 is also provided with a reference oscillation circuit 172 having an oscillation frequency of 10 MHz, and a frequency division circuit 174 for dividing the frequency of the output signal from the reference oscillation circuit 172 to provide a 1/8 period and generating a reference signal with the same frequency (1.25 MHz in the present embodiment) as that of the reference signal generated by the frequency division circuit 170. Moreover, the outputs (reference signals) from the frequency division circuits 170, 174 are selectively inputted to the PLL circuit 150 via a switch SW1 for switching the reference signal.

The PLL circuit 150 takes in the reference signal inputted via the switch SW1 and the output from the local oscillation circuit 152 via their respective internal frequency division circuits, and controls the local oscillation circuit 152 based on the phase difference of the divided signals, so that the oscillation frequency of the local oscillation circuit 152 is controlled to provide a constant frequency of 955 MHz. The down-converter 128 is also provided with a CPU 176 to set the oscillation frequency of the local oscillation circuit 152 controlled by this PLL circuit 150, that is, the frequency division ratio of a frequency division circuit inside the PLL circuit 150.

Moreover, as to the carrier regeneration circuit 168, a carrier detection circuit 169 is provided for detecting the pilot signal carrier, and a detection signal indicating the presence/absence of the carrier (i.e., the pilot signal) outputted from the carrier detection circuit 169 is inputted to the CPU 176. Furthermore, the CPU 176 switches the switch SW1 based on this detection signal.

Furthermore, the down-converter 128 is provided with a frequency division circuit 178 for dividing the frequency of the output from the local oscillation circuit 152 and generating a pseudo pilot signal having a predetermined frequency of 53.75 MHz in the present embodiment, a BPF 180 for passing the pseudo pilot signal outputted from the frequency division circuit 178, an amplification circuit 182 for amplifying the pseudo pilot signal passed through the BPF 180 to provide a predetermined level, and a mixer 184 for mixing the pseudo pilot signal amplified in the amplification circuit 182 and the downward signal path leading to the LPF 134 from the HPF 132 to transmit an output toward the terminal side from the LPF 134. Additionally, disposed on a pseudo pilot signal path leading to the mixer 184 from the amplification circuit 182 is a switch SW2 for making on or off the path.

Moreover, when it is determined that there is no pilot signal in the carrier detection circuit 169, the switch SW2 is controlled and placed in an on state by a drive signal from the CPU 176.

Figure 5:
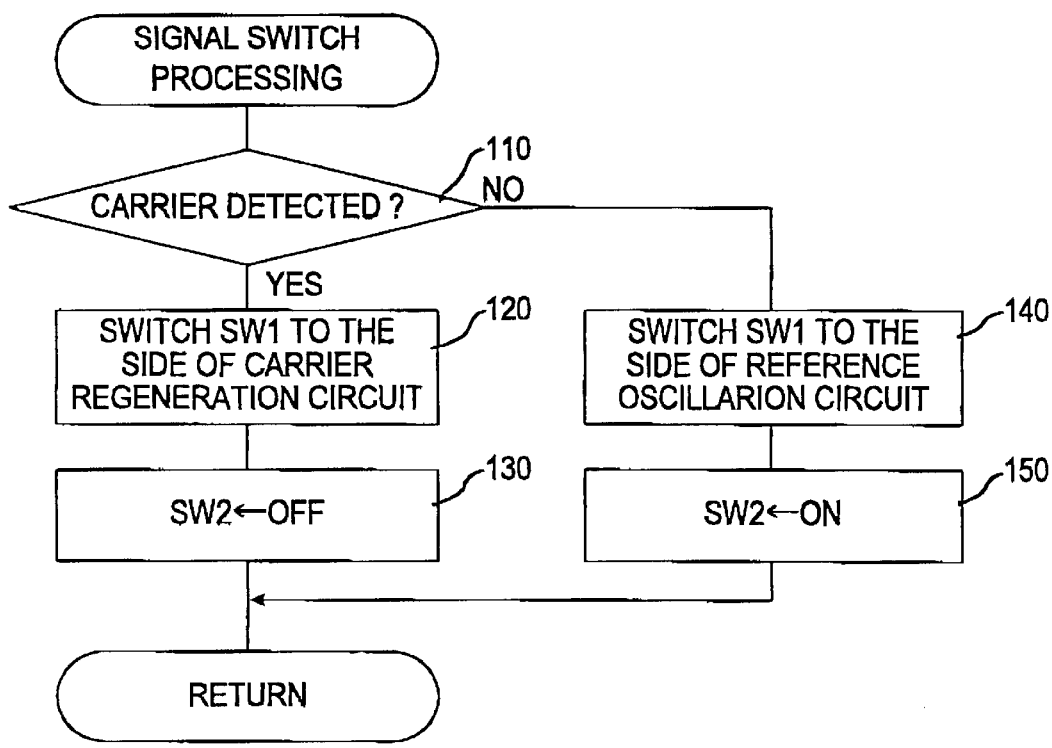
FIG. 5 is a flowchart showing a signal changeover processing executed in CPU of the down-converter of the second embodiment.

FIG. 5 is a flowchart showing a signal switch processing which is executed by the CPU 176 to switch the switches SW1 and SW2 based on the detection signal from the carrier detection circuit 169.

This processing is repeatedly carried out every predetermined time in the CPU 176. When the processing is started, it is first determined in step 110 based on the detection signal from the carrier detection circuit 169 whether or not the pilot signal carrier is detected by the carrier detection circuit 169.

Subsequently, when the pilot signal carrier is detected, in other words, when the pilot signal is inputted from the external bi-directional CATV system via the lead-in wire 6, in step 120 the switch SW1 is switched to the side of the carrier generation circuit 168. The reference signal generated based on the pilot signal in the frequency division circuit 170 is inputted to the PLL circuit 150, and in step 130 the switch SW2 is turned off to inhibit the output of the pseudo pilot signal to the terminal side, thereby ending this processing.

On the other hand, when the pilot signal carrier is not detected, in other words, when no pilot signal is inputted from the external bi-directional CATV system via the lead-in wire 6, the switch SW1 is switched to the side of the reference oscillation circuit 172 in step 140, so that the reference signal generated based on the output from the reference oscillation circuit 172 in the frequency division circuit 174 is inputted to the PLL circuit 150. Subsequently, in step 150, the switch SW2 is turned on to output the pseudo pilot signal to the terminal side, thereby ending the processing.

As described above, in the down-converter 128 of the present embodiment, when the pilot signal is included as the specific transmission signal in the downward signal inputted from the external bi-directional CATV system via the lead-in wire 6, the reference signal generated from this pilot signal is used to frequency-convert the in-building upward signal to the upward signal for the external bi-directional CATV system. Conversely, when no specific transmission signal is included in the downward signal, the reference signal generated based on the output from the incorporated reference oscillation circuit 172 is used to frequency-convert the in-building upward signal to the upward signal for the external bi-directional CATV system.

Therefore, even when the transmission of the pilot signal is discontinued on the side of the external bi-directional CATV system, or even when the pilot signal is not transmitted by the external bi-directional CATV system connected to the in-building CATV system, the in-building upward signal transmitted from the terminal side can be frequency-converted, and outputted as the upward signal to the external bi-directional CATV system.

Moreover, in the down-converter 128, when no pilot signal is included in the downward signal, the pseudo pilot signal is generated instead of the pilot signal, and transmitted to the terminal side. Therefore, when no pilot signal is included in the downward signal, even the up-converter 126 on the terminal side can be operated by the pseudo pilot signal, and the upward signal generated by the cable modem 24 on the terminal side can securely be outputted to the external bi-directional CATV system. Moreover, in this case, the down-converter 128 and up-converter 126 use the reference signal generated based on the output signal from the reference oscillation circuit 172 incorporated in the down-converter 128 to operate. Therefore, the down-converter 128 and up-converter 126 can be operated with the same reference signal, and the characteristic deterioration (phase noise, and the like) of the upward signal caused by the frequency deviation of the reference signal can be prevented.

Figure 6:
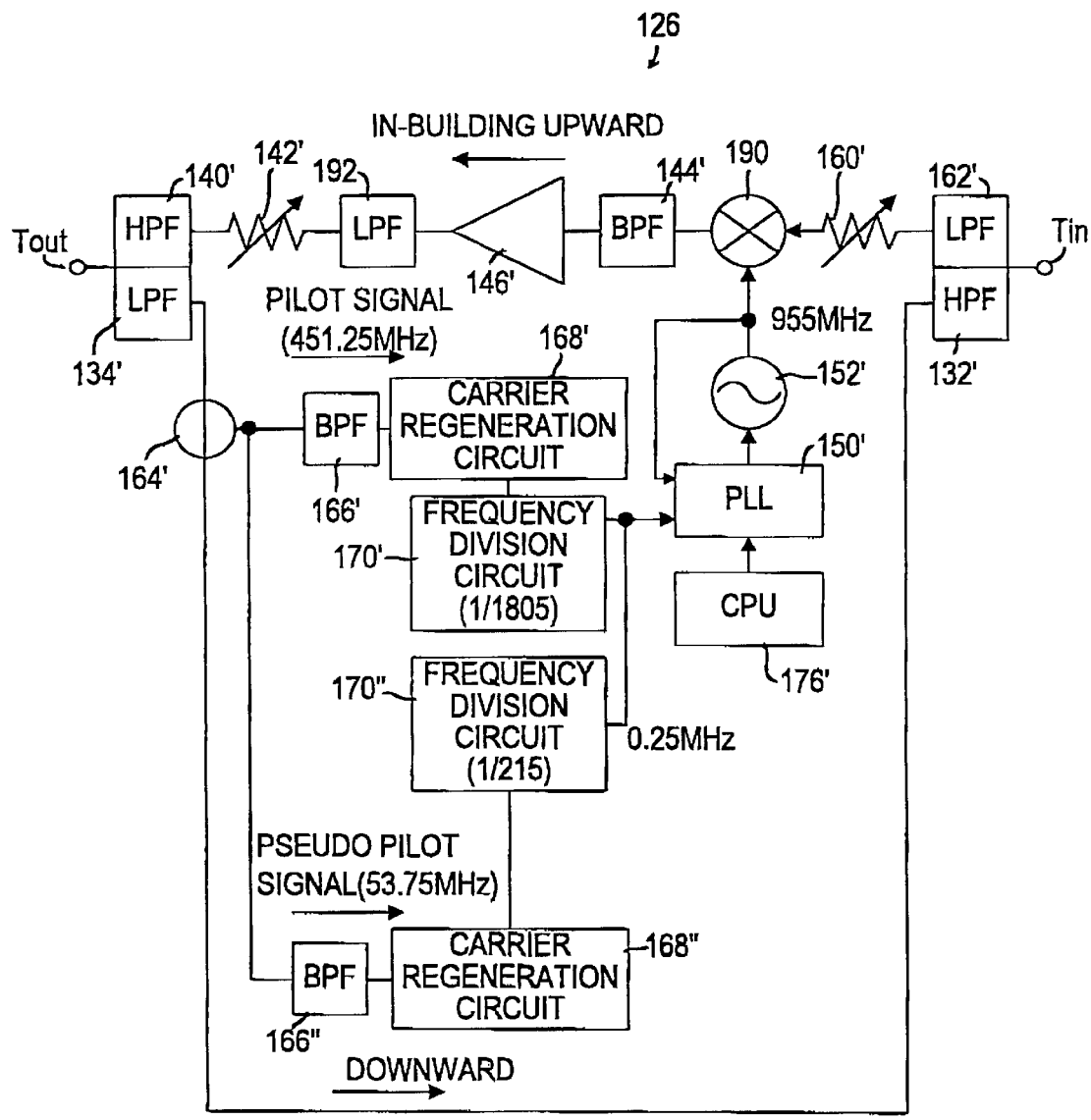
FIG. 6 is a block diagram showing the constitution of the up-converter according to the second embodiment.

Additionally, in the in-building CATV system in which the down-converter 128 of the present embodiment is used, the up-converter 126 prepared on the subscriber side may be constituted, for example, as shown in FIG. 6.

This up-converter 126 will next be described. Additionally, in FIG. 6, the constituting elements having the same functions as those of the down-converter 128 are denoted with the same numerals with "'", "''" attached thereto.

As shown in FIG. 6, the up-converter 126 is provided with an input terminal Tin for inputting an upward signal from the cable modem 24, and an output terminal Tout for outputting the frequency-converted in-building upward signal toward the terminal 20.

Moreover, the downward signal inputted to the output terminal Tout via the transmission line 12 is once taken into the up-converter 126 via an LPF 134' for blocking the in-building upward signal, and outputted to the terminal side from the input terminal Tin via an HPF 132' for blocking the upward signal. A1

Additionally, the mixer 90 receives the reference signal, with the oscillation frequency controlled to be constant by a PLL circuit 50', from the local oscillation circuit 52', and frequency converts the upward signal to the in-building upward signal. Moreover, the frequency of the reference signal for use in the frequency conversion by the mixer 90 is set to the same frequency (955 MHz) as the frequency of the converting reference signal for use in the frequency conversion of the in-building upward signal to the upward signal by the down-converter 28. As described previously, as with regard to FIG. 2 an down-converter 28, a microcomputer, identified as CPU 76', may be used to control PLL 50'.

On the other hand, the upward signal inputted to the input terminal Tin from the terminal side is taken into the up-converter 126 via an LPF 162' for blocking the downward signal. The introduced upward signal is then inputted to a mixer 190 via an attenuator 160' for attenuating the upward signal, and frequency-converted to the in-building upward signal using the signal of 955 MHz from a local oscillation circuit 152' bin the mixer 190. Additionally, the mixer 190 receives the signal, with the oscillation frequency controlled to be constant at 955 MHz by a PLL circuit 150', from the local oscillation circuit 152', and frequency- converts the upward signal to the in-building upward signal. Subsequently, the frequency-converted in-building upward signal is transmitted to an HPF 140' for blocking the downward signal via a BPF 144' for passing the in-building upward signal, an amplification circuit 146' for amplifying the in-building upward signal, an LPF 192 for passing the in-building upward signal, and an attenuator 142' for attenuating the in-building upward signal, and outputted toward the transmission line 12 from the HPF 140' via the output terminal Tout.

Furthermore, a directional coupler 164' for branching a part of the downward signal passed through the LPF 134' is disposed in the downward signal path leading to the HPF 132' from the LPF 134', and the downward signal branched by this directional coupler 164' is inputted to a BPF 166' for passing the pilot signal. Furthermore, the downward signal (pilot signal) passed through the BPF 166' is inputted to a carrier regeneration circuit 168', and the pilot signal carrier regenerated in the carrier regeneration circuit 168' is inputted to a frequency division circuit 170', which divides the frequency of the carrier to provide a $\frac{1}{1805}$ period and generates the reference signal of a predetermined frequency of 0.25 MHz. Subsequently, the reference signal generated in the frequency division circuit 170' is inputted to the PLL circuit 150'.

On the other hand, in the present embodiment, when there is no pilot signal, the down-converter 128 generates a pseudo pilot signal with a frequency different from that of the pilot signal, and transmits the pseudo pilot signal to the terminal side. Therefore, the up-converter 126 is provided with a circuit which can generate the reference signal to be inputted to the PLL circuit 150' even from the pseudo pilot signal.

Specifically, the up-converter 126 is provided with a BPF 166" for passing the pseudo pilot signal among the downward signals branched by the directional coupler 164', a carrier regeneration circuit 168" for regenerating the carrier from the pseudo pilot signal passed through the BPF 166", and a frequency division circuit 170" for dividing the frequency of the regenerated pseudo pilot signal carrier to provide a $\frac{1}{215}$ period and generating the reference signal with a predetermined frequency of 0.25 MHz, Moreover, the reference signal generated in this frequency division circuit 170" is also inputted to the PLL circuit 150'. Additionally, the up-converter 126 is also provided with a CPU 176' for setting the oscillation frequency of the local oscillation circuit 152' controlled by the PLL circuit 150'.

Therefore, in the up-converter 126, even when there exists no pilot signal inputted as one of the downward signals from the external bi-directional CATV system, the upward signal can accurately be frequency-converted to the in-building upward signal based on the pseudo pilot signal generated in the down-converter 128.

One embodiment of the present invention has been described above, but the present invention is not limited to the above-described embodiment, and can be embodied variously.

For example, in the above-described embodiment, the down-converter 128 generates the signal with the frequency different from that of the pilot signal in the bi-directional CATV system, as the pseudo pilot signal, but the pseudo pilot signal with the same frequency (451.25 MHz) as that of the pilot signal may be generated. This obviates the necessity of providing the up-converter 126 with the circuit (BPF 166", carrier regeneration circuit 168", and frequency division circuit 170") to generate the reference signal from the pseudo pilot signal. Therefore, the constitution of the up-converter 126 can further be simplified.

Moreover, the reference signal for the frequency conversion may be generated using only the pilot signal included in the downward signal. In this case, the carrier detection circuit 169, the reference signal oscillation circuit 172, the frequency division circuit 174, and the switch SW1 for switching the frequency division circuit 170 and the frequency division circuit 174 are unnecessary in the down-converter 128. Moreover, the constitution for generating the pseudo pilot signal is unnecessary. In a similar manner as above, the up-converter 126 does not need to be provided with the circuit (BPF 166", carrier regeneration circuit 168", and frequency division circuit 170") to generate the reference signal from the pseudo pilot signal.

Figure 7:
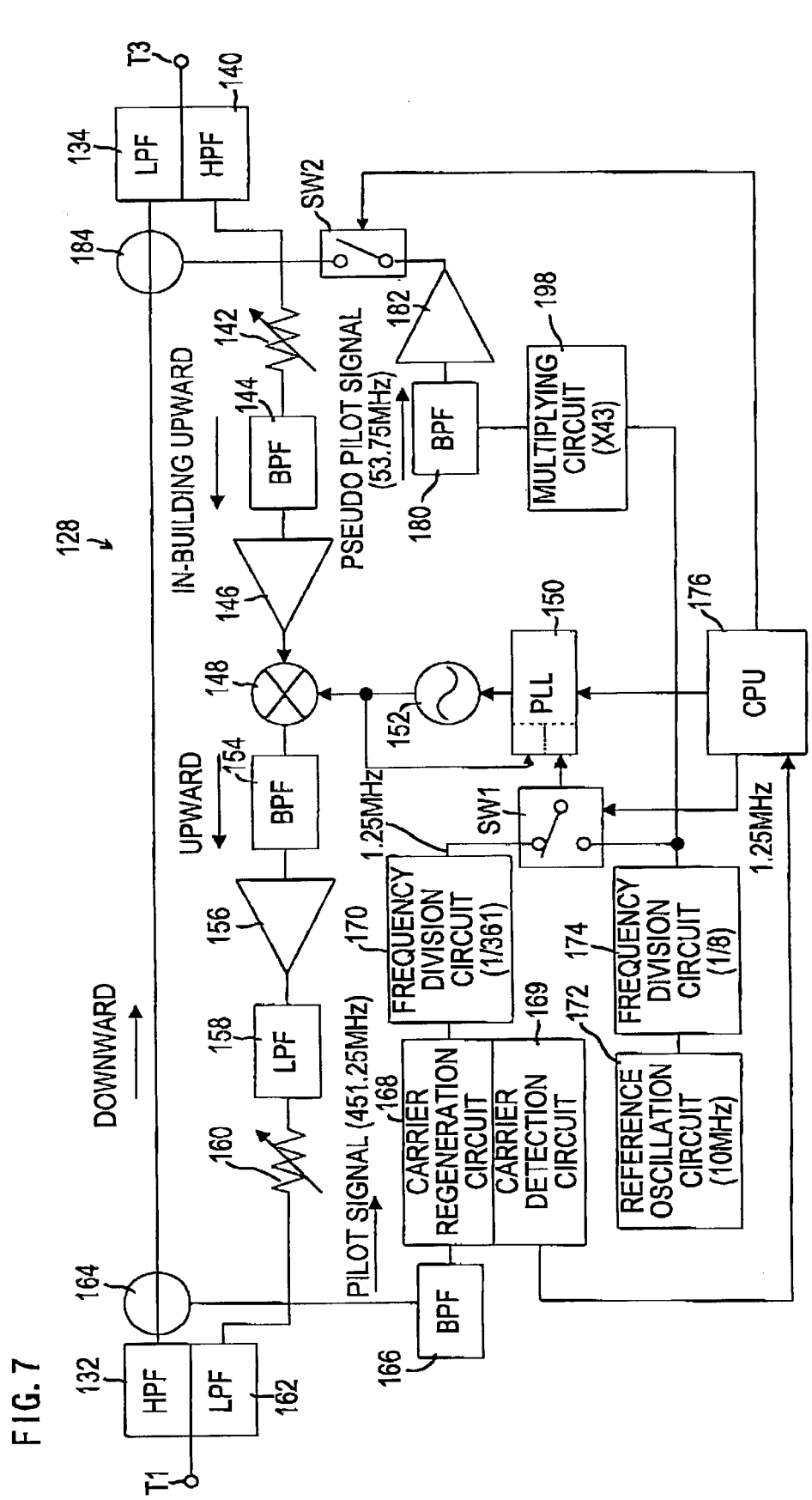
FIG. 7 is a block diagram showing the modification example of the down-converter.

Furthermore, in the above-described embodiment, when the pseudo pilot signal is generated in the down-converter 128, the output controlled based on the reference signal and transmitted from the local oscillation circuit 152 is divided. For example, as shown in FIG. 7, the pseudo pilot signal (53.75 MHz) may be generated by using a multiplying circuit 198 to multiply (×43) the reference signal (1.25 MHz) generated in the frequency division circuit 174. Additionally, FIG. 7 is different from FIG. 4 only in the circuit for generating the pseudo pilot signal. Since the constitution other than the above-described constitution is the same as in FIG. 4, other constituting elements are denoted with the same numerals as in FIG. 4, and the description thereof is omitted.

What is claimed is:

1. An in-building CATV transmission system for communicating a downward signal input from a CATV system to an in-building terminal and for transmitting an upward signal from the terminal to the CATV transmission system, comprising:

an in-building transmission line, a down-converter, and an up-converter, the down-converter connected with the CATV system for receiving the downward signal in a first frequency range and transmitting a corresponding in-building downward signal through the in-building transmission line to the up-converter, the up-converter being connected with the terminal and providing a corresponding downward signal to the terminal, the up-converter being connected to the terminal for receiving the upward signal from the terminal and transmitting a corresponding in-building upward signal to the down-converter through the in-building transmission line, and the down-converter receiving the in-building upward signal and providing the corresponding upward signal to the CATV system, the down-converter including a frequency generator for generating a first converting reference signal and a reference signal generator for generating a transmitting reference signal wherein the transmitting reference signal frequency is lower than a lowest frequency of the downward signal, a down-mixer for generating the in-building downward signal by adding the transmitting reference signal to the downward signal, so that the downward signal in the in-building downward signal is in the first frequency range, and an up-signal receiving mixer connected from the first converting reference signal for extracting the upward signal from an in-building upward signal in a second frequency range and providing the upward signal to the CATV system, the up-converter including a receiving filter for extracting the downward signal from the in-building downward signal and providing the downward signal to the terminal and a phase-locked loop circuit for extracting the transmitting reference signal from the in-building downward signal and generating a second converting reference signal having the same frequency as the first converting reference signal, and an up-signal sending mixer connected from the second converting reference signal for frequency converting the upward signal into the in-building upward signal in the second frequency range and transmitting the in-building upward signal to the up-signal receiving mixer of the down-converter.

2. The in-building CATV transmission system of claim 1 for communicating downward signal input from a CATV system to an in-building terminal and for transmitting an upward signal from the terminal to the CATV transmission system, wherein:

the reference signal generator comprises:

a frequency division circuit for deriving the transmitting reference signal from the first converting reference signal.

3. The in-building CATV transmission system of claim 1 for communicating a downward signal input from a CATV system to an in-building terminal and for transmitting an upward signal from the terminal to the CATV transmission system, wherein:

the frequency generator further comprises:

a pilot regenerator for generating a pilot reference signal from a CATV pilot signal from the downward signal for use as the first converting reference signal for extracting the upward signal from the in-building upward signal, and a transmission reference signal selector for selecting the CATV pilot signal in the downward signal as the transmitting reference signal of the in-building downward signal.

4. The in-building CATV transmission system of claim 3 for communicating a downward signal input from a CATV system to an in-building terminal and for transmitting an upward signal from the terminal to the CATV transmission system, the frequency generator further comprises:

a pilot signal generator for generating a pseudo pilot reference signal, a pilot signal detector for generating a pilot detect signal when a pilot signal is present in the downward signal, a pilot reference signal selector responsive to the pilot detect signal for selecting the pilot reference signal as the first converting reference signal when a pilot signal is present in the downward signal and for selecting the pseudo pilot reference signal as the first converting reference signal when a pilot signal is not present in the downward signal, transmission reference signal selector being responsive to the pilot detect signal for selecting the transmitting reference signal generated by the reference signal generator as the transmitting reference signal of the in-building downward signal.

5. The in-building CATV transmission system of claim 4, wherein:

the pilot signal generator generates the pseudo pilot reference signal from an output of the frequency generator.

6. The in-building CATV transmission system of claim 4 for communicating downward signal input from a CATV system to an in-building terminal and for transmitting an upward signal from the terminal to the CATV transmission system, wherein:

the reference signal generator comprises:
a circuit for deriving the transmitting reference signal from the output of a pilot signal generator.

7. An in-building CATV transmission system for communicating a downward signal input from a CATV system to an in-building terminal and for transmitting an upward signal from the terminal to the CATV transmission system, comprising:

a down-converter connected with the CATV system for
receiving the downward signal in a first frequency range and transmitting a corresponding in-building downward signal through an in-building transmission line to an up-converter connected with the terminal, and
receiving an in-building upward signal from the transmission line in a second frequency range and providing a corresponding upward signal to the CATV system, and an up-converter connected to the transmission line for
receiving the in-building downward signal and transmitting a downward signal to the terminal, and
converting an upward signal from the terminal to a corresponding in-building upward signal to the down-converter in the second frequency range, the down-converter including:
a first frequency generator for generating a transmitting reference signal derived from a first converting reference signal wherein the transmitting reference signal frequency is lower than a lowest frequency of the downward signal,
an in-building downward signal generator for generating the in-building downward signal, wherein the in-building downward signal includes the downward signal and the transmitting reference signal, and
an up-signal converter for converting the in-building upward signal to an upward signal, the up-converter including
a receiving filter for extracting the downward signal and the transmitting reference signal from the in-building downward signal,
a second signal generator generating a second converting reference signal having the same frequency as the first converting reference signal based on the transmitting reference signal, and
an in-building up-signal generator for generating the in-building upward signal by frequency converting the upward signal into the second frequency range using the second converting reference signal.

8. The in-building CATV transmission system of claim 7 for communicating a downward signal input from a CATV system to an in-building terminal and for transmitting an upward signal from the terminal to the CATV transmission system, wherein:

the frequency generator further comprises:
a pilot regenerator for generating a pilot reference signal from a CATV pilot signal from the downward signal for use as the first converting reference signal for extracting the upward signal from the in-building upward signal, and
a transmission reference signal selector for selecting the CATV pilot signal in the downward signal as the transmitting reference signal of the in-building downward signal.

9. The in-building CATV transmission system of claim 8 for communicating a downward signal input from a CATV system to an in-building terminal and for transmitting an upward signal from the terminal to the CATV transmission system, the frequency generator further comprises:

a pilot signal generator for generating a pseudo pilot reference signal,
a pilot signal detector for generating a pilot detect signal when a pilot signal is present in the downward signal,
a pilot reference signal selector responsive to the pilot detect signal for selecting the pilot reference signal as the first converting reference signal when a pilot signal is present in the downward signal and for selecting the pseudo pilot reference signal as the first converting reference signal when a pilot signal is not present in the downward signal,
transmission reference signal selector being responsive to the pilot detect signal for selecting the transmitting reference signal generated by the reference signal generator as the transmitting reference signal of the in-building downward signal.

* * * * *